United States Patent [19]

Wehrli

[11] 3,855,306

[45] Dec. 17, 1974

[54] PROCESS FOR THE PREPARATION OF 2,4,5-TRIMETHOXYBENZALDEHYDE

[75] Inventor: Pius Anton Wehrli, North Caldwell, N.J.

[73] Assignee: Hoffmann-La Roche Inc., Nutley, N.J.

[22] Filed: Mar. 27, 1972

[21] Appl. No.: 238,629

[52] U.S. Cl. .............................................. 260/600
[51] Int. Cl. ............................................ C07c 45/00
[58] Field of Search ................................... 260/600

[56] References Cited
OTHER PUBLICATIONS
Pearl et al., JACS, Vol. 74, (1952), 4262–4263.

Bradley et al., Jour. Chem. Soc., (London), (1930), 793–817.

McIvor et al., Canadian Jour. of Chemistry, Vol. 31, (1953), 298–302.

Primary Examiner—Bernard Helfin
Attorney, Agent, or Firm—Samuel L. Welt; Jon S. Saxe; George M. Gould

[57] ABSTRACT

Process for the preparation of 3,4,5-trimethoxybenzaldehyde from vanillin comprising the steps of bromination, hydrolysis and methylation.

22 Claims, No Drawings

PROCESS FOR THE PREPARATION OF 2,4,5-TRIMETHOXYBENZALDEHYDE

BRIEF DESCRIPTION OF THE INVENTION

The present invention relates to a new, highly efficient and economical synthesis of 3,4,5-trimethoxybenzaldehyde from the highly accessible and relatively inexpensive starting material, vanillin. 3,4,5Trimethoxybenzaldehyde is a valuable chemical intermediate for the preparation of medicinal agents such as the sulfonamide potentiator trimethoprim. The present synthesis proceeds via three chemical steps in high yield utilizing relatively inexpensive reagents and solvents and requiring a minimum of manipulative steps. The present process thus represents a major advance over prior art procedures for each of the individual steps involved, and the combination of steps is greatly superior to any prior art method for preparing 3,4,5-trimethoxybenzaldehyde. The present process is extremely practical for large-scale synthesis.

The overall conversion from vanillin to 3,4,5-trimethoxybenzaldehyde is depicted in the following reaction scheme:

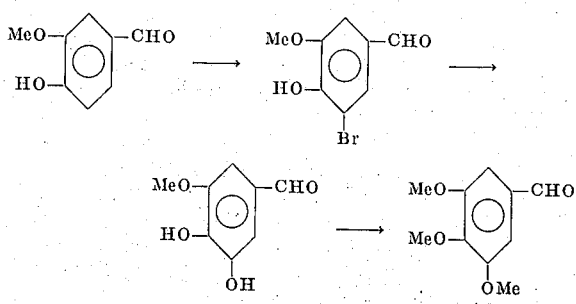

The three steps involved are:
1. bromination of vanillin to afford 5-bromovanillin;
2. hydrolysis of 5-bromovanillin to afford 5-hydroxyvanillin; and
3. methylation of 5-hydroxyvanillin to afford 3,4,5-trimethoxybenzaldehyde.

The bromination of vanillin to afford 5-bromovanillin is performed by contacting vanillin with bromine in an acidic solvent medium. The bromination is generally carried out using at least one mole of bromine for each mole of vanillin. It is preferred to utilize a slight excess, most preferably about 10% excess, bromine in the bromination step.

Suitable acidic solvent media include, for example, concentrated aqueous mineral acids, e.g., concentrated aqueous hydrobromic acid, preferably 48% aqueous hydrobromic acid; glacial acetic acid, and so forth.

A critical feature of the present bromination reaction is the addition of a solution of vanillin in the acidic solvent medium to the bromine, while keeping the temperature between 0° and 5°. In this manner, an exceedingly high yield (≈99%) of high purity (>98%) 5-bromovanillin is obtained. This extremely high conversion is particularly advantageous since it is rather difficult to separate large amounts of unreacted vanillin from 5-bromovanillin. Thus, because of the higher purity of product produced in the bromination reaction, less manipulation in terms of recrystallization, etc., is needed. In fact, crude reaction product (purity about 98%) can be utilized directly for the next step without any further need for purification. This is a decided advantage over prior art brominations of vanillin (e.g., J. Am. Chem. Soc., volume 51, p. 2193), which afforded substantially lower yields and/or impure product.

The hydrolysis of 5-bromovanillin to 5-hydroxyvanillin is accomplished by contacting the 5-bromovanillin with an alkali metal hydroxide in the presence of copper metal in an aqueous medium.

Any alkali metal hydroxide is suitable for the present reaction. However, sodium hydroxide is preferred. Generally, at least one mole of alkali metal hydroxide is employed for each mole of 5-bromovanillin. Preferably an excess of alkali metal hydroxide, most preferably a 5 to 10 molar excess is employed.

A critical feature of the present hydrolysis reaction is the use of a small amount, from about 1 to about 10 mole %, most preferably about 3 mole %, of copper powder, as compared with the 5-bromovanillin present. In this manner, a relatively minor amount of reduction of 5-bromovanillin to vanillin occurs, and high yields of 5-hydroxyvanillin are obtained.

Surprisingly, it has been found that the use of a small amaount of copper powder allows the hydrolysis reaction to proceed at a controllable rate at relatively low temperatures, 50° to 120°, as compared with prior art hydrolysis procedures (e.g., J. Chem. Soc., London, 1930, p. 811) utilizing large amounts of copper metal, and pressure reactions at about 200°. The present reaction is preferably conducted at the reflux temperature of the reaction medium which is about 100° to 120°, and at atmospheric pressure. It should be emphasized that pressure is not a critical parameter, and that while the reaction is preferably conducted at atmospheric pressure, it can be performed as well at sub- or super-atmospheric pressures.

The reaction product, 5-hydroxyvanillin, is suitably isolated from the reaction mixture by a procedure of hot liquid-liquid extraction. In this procedure, the hot reaction mixture, after acidification with a strong acid, preferably a mineral acid such as concentrated hydrochloric acid, is continuously extracted with a water immiscible organic solvent at an elevated temperature, preferably between about 60° and about 100°. Suitable solvents for the hot liquid-liquid extraction include hydrocarbons, e.g., benzene or toluene; esters, e.g., ethyl acetate; and so forth. An especially preferred solvent for the hot liquid-liquid extraction is toluene.

The reaction product extracted into the organic solvent in the above step is then purified by recrystallization. An especially preferred solvent for recrystallization is toluene. In a preferred procedure, toluene is used as the extracting solvent in the hot liquid-liquid extraction and also serves by cooling of the hot extract, as a recrystallization solvent.

The methylation of 5-hydroxyvanillin to 3,4,5-trimethoxybenzaldehyde is carried out by contacting the 5-hydroxyvanillin with dimethyl sulfate in the presence of an alkali metal carbonate in an organic medium.

The critical features of the present methylation process are the use of only a slight excess of dimethyl sulfate over the theoretical amount necessary for methylation of two phenol groups, preferably about 15 to 25% excess; the use of powdered alkali metal carbonate as the base; and the use of an organic solvent medium. In this manner, high yields of 3,4,5-trimethoxybenzaldehyde are obtained. This is to be compared with prior art processes (e.g., J. Chem. Soc., London, 1930, p. 811)

utilizing large excesses of dimethyl sulfate, alkali metal hydroxides as bases, and aqueous media, affording relatively poor yields of product.

As alkali metal carbonate for the present process there may be utilized, for example, sodium carbonate, potassium carbonate, lithium carbonate, and so forth; sodium carbonate is preferred. It is preferred to utilize from about 20 to about 40% excess carbonate over the two moles necessary, based upon the amount of 5-hydroxyvanillin present.

Suitable organic media for the present reaction include ketones, e.g., acetone and methyl ethyl ketone; ethers, e.g., tetrahydrofuran and dioxane; hydrocarbons, e.g., hexane, heptane, benzene and toluene; and so forth. An especially preferred medium is acetone.

Small amounts of stronger bases, for example alkali metal hydroxides, e.g., sodium hydroxide or potassium hydroxide, may also be added to the reaction mixture, although this is not necessary for the success of the methylation reaction.

The temperatures of the methylation reaction is suitably between about 40° and 120°, preferably the reflux temperature of the reaction medium. The reaction product, 3,4,5-trimethoxybenzaldehyde, is isolated by removal of the reaction solvent, preferably by evaporation, and extraction of the residue with water to remove inorganic material. In this manner, high purity 3,4,5-trimethoxybenzaldehyde is obtained. Higher purity product (99+% pure) may be obtained by standard purification techniques, e.g., distillation of the crude reaction product.

The process of the present invention will be more readily understood by reference to the following specific examples. All temperatures specified are in degrees Centigrade.

EXAMPLE 1

Preparation of 5-Bromovanillin

A 2-l. 3-necked flask, equipped with a mechanical stirrer, thermometer and 500 ml dropping funnel was charged with 115.7 g (0.722 mol, 37.4 ml) of bromine. In the meantime, a solution of 100 g (0.658 mol) of vanillin (Aldrich Chemical Co., m.p. 82°-84°) in 705 g (470 ml) of 48% HBr was prepared in the dropping funnel. While the reaction flask was immersed in an ice bath, the solution of vanillin was dropped into the bromine with stirring over a period of 1 hr., keeping the temperature at about 5°. The bromovanillin precipitated as light yellow crystals. The slurry was stirred for an additional hour in the ice bath, diluted with 940 ml of water and kept for 1 hour at 0°-5° with stirring. The crystals were collected on a sintered glass funnel and washed thoroughly with a total of 1000 ml of water. The material was dried at room temperature to constant weight. Yield: 150.9 g (99.4%), m.p. 163°-164°, VPC purity 98%.

EXAMPLE 2

Preparation of 5-Hydroxyvanillin

Sodim hydroxide, 61.2 g (1.53 mol), was dissolved in 750 ml of water in a 2-l. round-bottomed flask. To the still-warm solution was added 50.0 g (0.217 mol) of 5-bromovanillin, prepared as in Example 1, and 0.5 g of copper powder (No. 1618, General Chemical Division, Allied Chemical Corporation). A white solid precipitated. The reaction mixture was refluxed vigorously under $N_2$ and with magnetic stirring. The color changed gradually from yellow to green to dark green and, after ca. 6 hours, all of the solid material was dissolved. After 27 hours of refluxing, the reaction was acidified with 113 ml of conc. HCl (pH~2) and continuously extracted with toluene at 85° for 47 hours while being stirred magnetically. The toluene receiver contained 450 ml of toluene. The total volume of toluene in the system was ca. 1300 ml. The flask containing the hot toluene extract was disconnected while still hot, and the brown solution was transferred to a 1—l. beaker for crystallization in an ice bath. After cooling for 2 hours, the product was filtered, washed with ca. 100 ml of ice-cold toluene and dried at 70° to constant weight. Yield: 30.4 g (83.3%) of light brown plates, m.p. 132.5°-134.0°.

EXAMPLE 3

Preparation of 3,4,5-Trimethoxybenzaldehyde

Into a 1—l. round-bottomed flask equipped with a magnetic stirrer and reflux condenser were placed: 50 g (0.298 mol) of 5-hydroxyvanillin prepared as described in Example 2, 500 ml of acetone, 91.0 g (0.716 mol) of dimethyl sulfate, 100 g (0.806 mol) of finely ground $Na_2CO_3·H_2O$ and 10 ml of 10% KOH in methanol. The heterogeneous mixture was stirred under vigorous reflux for 24 hours, after which the reflux condenser was replaced with a descending condenser. The solvent was distilled at a bath temperature of ca. 100° until the distillation ceased. To the solid residue was added 400 ml of water and the heterogeneous mixture was stirred *vigorously* for 2 hours at room temperature followed by 1 hour at 0°-5°. The light brown crystals were filtered by suction, washed with 3 × 150 ml of ice water and air dried to constant weight. Yield: 55.1 g (94%), m.p. 72.5°-74°. After distillation at 0.5mm/130°, there was obtained a 90% yield of 3,4,5-trimethoxybenzaldehyde, m.p. 73.5°-75.0°, VPC purity 99.3%.

I claim:

1. A process for the preparation of 3,4,5-trimethoxybenzaldehyde which comprises:
    a. adding a solution of vanillin in an acidic solvent medium selected from the group consisting of concentrated aqueous mineral acids and glacial acetic acid to bromine at a temperature about 0° and about 5°C to afford 5-bromovanillin;
    b. contacting the 5-bromovanillin prepared in (a) with an alkali metal hydroxide and from about 1 to about 10 mole % of copper powder, in water at a temperature of from about 50° to about 120° C to afford 5-hydroxyvanillin; and
    c. contacting the 5-hydroxyvanillin prepared in (b) with a 15 to 25% excess of dimethyl sulfate, and a powdered alkali metal carbonate, in an organic medium selected from the group consisting of acetone, methyl ethyl ketone, tetrahydrofuran, dioxane, hexane, heptane, benzene and toluene.

2. The process of claim 1, wherein the acidic solvent medium is 48% aqueous hydrobromic acid.

3. The process of claim 1 wherein the alkali metal hydroxide is sodium hydroxide.

4. The process of claim 1 wherein about 3 mole % copper is utilized.

5. The process of claim 1 wherein the 5-hydroxyvanillin is isolated by hot liquid-liquid extraction with a water-immiscible organic solvent.

6. The process of claim 5 wherein the water-immiscible organic solvent comprises toluene.

7. The process of claim 1 wherein the alkali metal carbonate is sodium carbonate.

8. The process of claim 1 wherein the organic medium in step (c) comprises acetone.

9. The process of claim 1 wherein the temperature in step (c) is between about 40° and about 120°C.

10. The process of claim 9 wherein the temperature is the reflux temperature of the reaction medium.

11. A process for the preparation of 5-bromovanillin which comprises adding a solution of vanillin in an acidic solvent medium selected from the group consisting of concentrated aqueous mineral acids and glacial acetic acid to bromine at a temperature between about 0° and about 5°C.

12. The process of claim 11 wherein the acidic solvent medium is 48% percent aqueous hydrobromic acid.

13. A process for the preparation of 5-hydroxyvanillin which comprises contacting 5-bromovanillin with an alkali metal hydroxide and from about 1 to about 10 mole % of copper powder in water at a temperature of from about 50° to about 120°C.

14. The process of claim 11 wherein the alkali metal hydroxide is sodium hydroxide.

15. The process of claim 13 wherein about 3 mole% copper is utilized.

16. The process of claim 13 wherein the 5-hydroxyvanillin is isolated by hot liquid-liquid extraction with a water-immiscible organic solvent.

17. The process of claim 16 wherein the water immiscible organic solvent comprises toluene.

18. A process for the preparation of 3,4,5-trimethoxybenzaldehyde which comprises contacting 5-hydroxyvanillin with a 15 to 25% excess of dimethyl sulfate, and a powdered alkali metal carbonate, in an organic medium selected from the group consisting of acetone, methyl ethyl ketone, tetrahydrofuran, dioxane, hexane, heptane, benzene and toluene.

19. The process of claim 18 wherein the alkali metal carbonate is sodium carbonate.

20. The process of claim 18 wherein the organic medium comprises acetone.

21. The process of claim 18 wherein the temperature is between about 40° and about 120°C.

22. The process of claim 21 wherein the temperature is the reflux temperature of the reaction medium.

* * * * *